United States Patent [19]

Bishop

[11] 4,048,636

[45] Sept. 13, 1977

[54] SECONDARY RADAR/IFF ANTI-TARGET SPLITTING AZIMUTH DETERMINER

[75] Inventor: Walton B. Bishop, Oxon Hill, Md.

[73] Assignee: The United States of America as represented by the Secretary of the Navy, Washington, D.C.

[21] Appl. No.: 617,228

[22] Filed: Sept. 26, 1975

[51] Int. Cl.² .............................................. G01S 9/56
[52] U.S. Cl. ............................ 343/6.5 LC; 343/5 VQ
[58] Field of Search ............ 343/5 VQ, 6.5 LC, 5 DP

[56] References Cited

U.S. PATENT DOCUMENTS 3,579,237  5/1971  Steingart et al. ................. 343/5 VQ
3,781,881  12/1973  Hovey ............................... 343/5 DP Primary Examiner—Malcolm F. Hubler
Attorney, Agent, or Firm—R. S. Sciascia; Philip Schneider; Norman Brown

[57] ABSTRACT

The present invention determines the occurrence of leading and trailing edges of a target under evaluation by an IFF system. A target's "leading edge" is declared when a predetermined number $T_L$ of correct replies is found to exist in a predetermined group of $W_L$ received replies in response to a number B of interrogations. A target's "trailing edge" is declared when a number $T_z$ of incorrect replies is found to exist in a group of $W_z$ replies if either at least a number B of interrogations have been transmitted after the target's "leading edge" has been declared, or a number $T_u$ of correct replies is found to exist in a group of $W_u$ received replies followed by reduction of this number $T_u$ to a smaller number $T_r$.

3 Claims, 2 Drawing Figures

# SECONDARY RADAR/IFF ANTI-TARGET SPLITTING AZIMUTH DETERMINER

BACKGROUND OF THE INVENTION

The present invention relates to IFF systems, and more particularly to techniques for determining the occurrence of a target's "leading" and "trailing" edges.

The position with respect to an IFF antenna where the IFF system first reliably receives acceptable replies from a target is generally termed the target's "leading edge." Similarily, the "trailing edge" is generally considered to be the target's angular position where satisfactory replies are no longer reliably received.

In general, most existing IFF (secondary radar) equipment determines "leading" and "trailing edges" through either sliding window or run determining techniques. Basically in a sliding window type technique, received replies are examined to determine if a number $T_L$ of correct replies exist in a number $W_L$ of replies to interrogations. This technique also examines replies to declare a "trailing edge" when a number $T_t$ of incorrect replies are received in a group of $W_t$ replies to a number $U_t$ of interrogations. In contrast, run determining techniques examine the received replies for a run, or sequence, of a predetermined number $R_L$ of correct replies received, and declare a "trailing edge" only when interrogations elicit a run of $R_t$ replies which are not correct replies. A "leading edge" is determined in the converse manner. Still other existing techniques makes use of up-down counters in order to determine when a "leading edge" or "trailing edge" exists.

Once a leading and trailing edge has been declared, it is important to determine the target azimuth. In prior IFF equipments, the azimuth of a responding target has generally been estimated by finding the difference between the antenna where a "trailing edge" was declared and where a "leading edge" was declared, and then estimating the target's position by adding half the difference between the two azimuths to the "leading edge" azimuth.

This method of determining target azimuth has two basic faults: first, since a "trailing edge" is usually declared very quickly—anytime a few interrogations fail to elicit correct replies—various types of interference may cause a "trailing edge" to be prematurely and spuriously declared. An early spurious "trailing edge" declaration is usually accompanied by a second and erroneous "leading edge" declaration, and the consequent display of the one target as two. Second, all target azimuths estimated in this manner are biased slightly in the direction of the interrogator's antenna rotation. This bias, being essentially the same for all targets (and generally less than a degree in current systems) has not yet constituted a significant operational problem. In further systems however, where interrogation repetition rates may be reduced and more precise aircraft control required, this angular bias error may become an important factor to be reckoned with.

SUMMARY OF THE INVENTION

Occurence of an IFF target's leading and trailing edges is determined by the present invention.

A target's "leading edge" is deemed to occur upon counting to a number $T_L$ of correct replies received in a group of $W_L$ responses to a number B of interrogations.

A target's "trailing edge" is deemed to occur only upon counting to a number $T_z$ of incorrect replies received in a group of $W_z$ responses to interrogations, and either a number B of interrogations having been transmitted or the number of correct replies counted has reached a predetermined number $T_u$ and then decreased to a lesser predetermined number $T_t$.

It is therefore an object of the present invention to determine the occurrence of an IFF target's "leading edge";

It is another object of the present invention to determine the occurrence of an IFF target's "trailing edge";

It is a further object of the present invention to determine the occurrence of a IFF target's "trailing edge" in a manner to prevent the target appearing as two targets.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
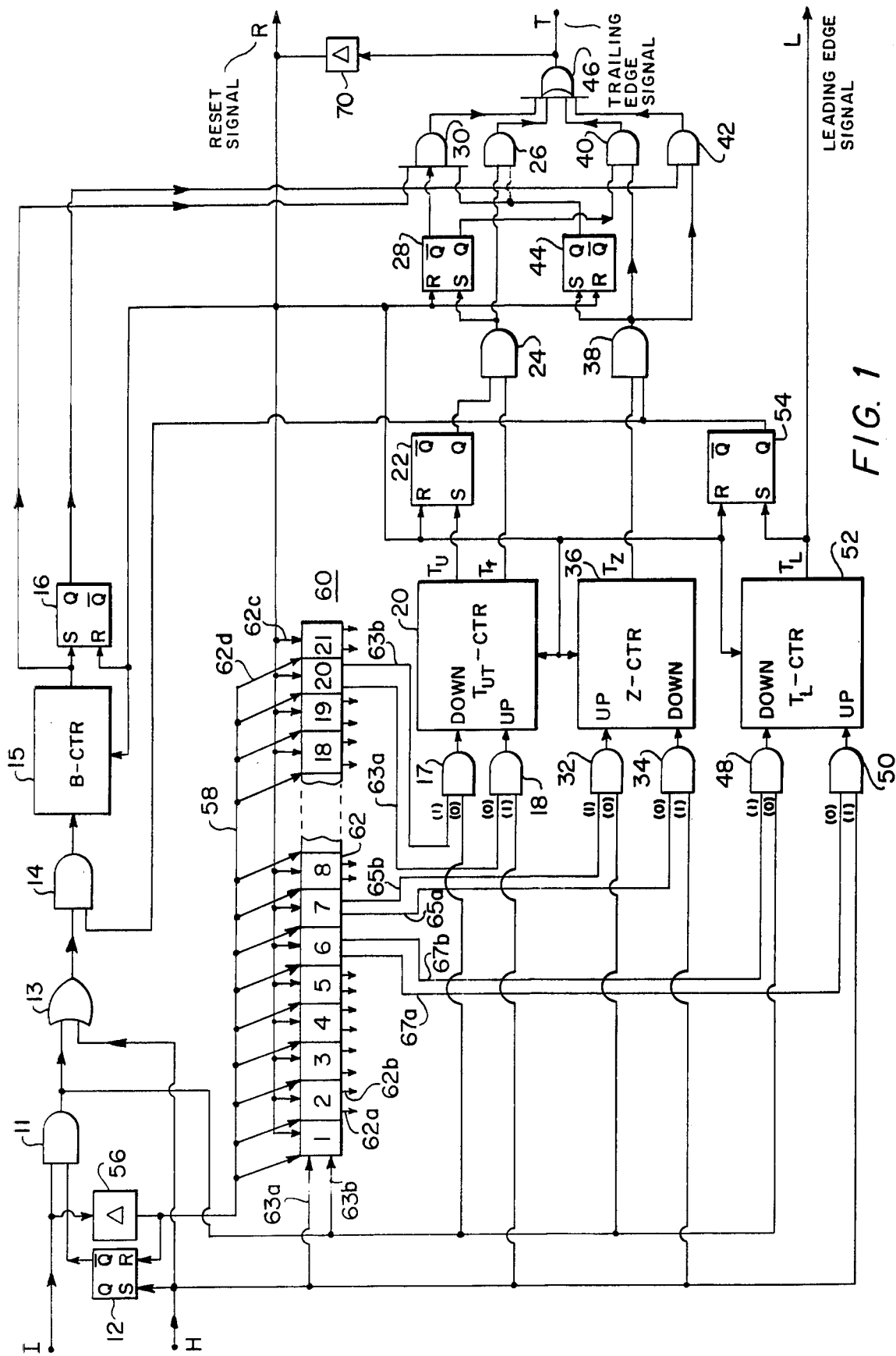
FIG. 1 is a schematic block diagram of an embodiment of the present invention.
Figure 2:
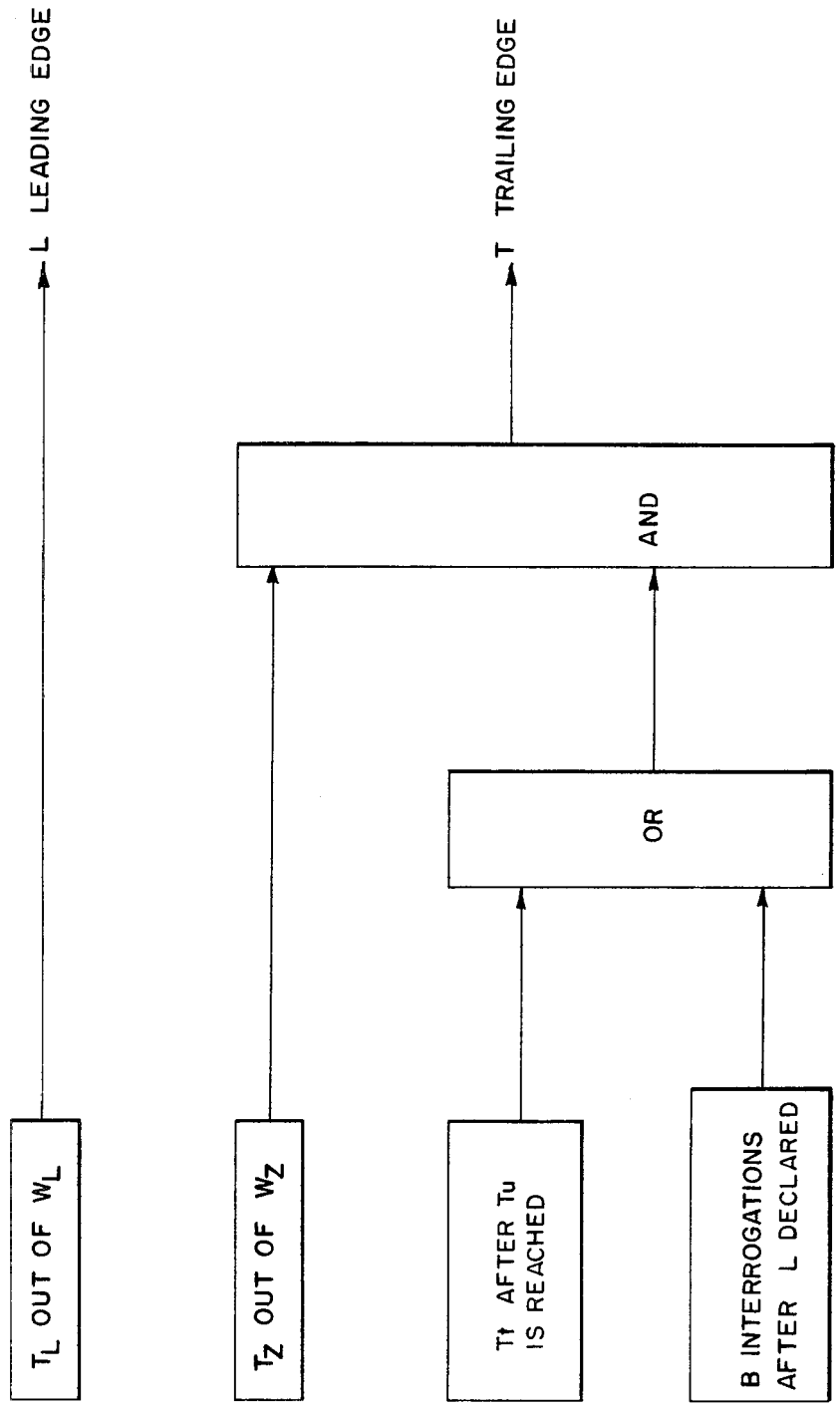
FIG. 2 is a functional block diagram of the embodiment illustrated in FIG. 1.

Referring now to FIG. 1, the Anti-Target-Splitting-/Beam-Edge Detector (ATS/BED) embodiment of the present invention has two input terminals I and H and three output terminals T, R, L. An AND device 11 has a first input terminal connected to a complementary output terminal $\bar{Q}$ of a flip-flop device 12. The output terminal AND gate 11 (hereinafter also referred to as AND 11) is coupled to an input terminal of an OR gate 13 whose other input terminal is coupled to input terminal H. Terminal H is also coupled to a set-terminal S of flip-flop 12. The output of OR gate 13 (hereinafter also referred to as OR 13) is coupled to a first input terminal of an AND device 14 whose output is in turn coupled to the input of an interrogations-received counter (termed a B-counter) 15. The output of counter 15 is connected to the set terminal S of a flip-flop device 16.

The output of AND 11 is coupled to a "zero" input terminal of an AND device 17. Input terminal H is coupled to a "one" input terminal of an AND device 18.

An upper threshold counter (denoted as $T_{ut}$ counter) 20 has a down-count input terminal coupled to the output of AND 17, and an up-count input terminal coupled to the output of AND 18.

Counter 20 has a $T_u$ output terminal coupled to the set terminal S of a flip-flop device 22, and an output terminal $T_t$ coupled to an input terminal of an AND gate 24. The other input of AND gate 24 is coupled to the non-complementary output terminal Q of flip-flop 22. The output of AND 24 is coupled to a first input terminal of an AND device 26, and to the set terminal S of a flip-flop device 28. The complementary output terminal $\bar{Q}$ of flip-flop 28 is coupled to an input terminal of an AND gate 30. A second input terminal of AND gate 30 is connected to the output of B-counter 15.

An AND gate 32 has a "zero" input terminal coupled to the output of AND 11. An AND gate 34 has a "one" input terminal coupled to device input terminal H. A zero counter (denoted as Z-counter) 36 has an up-count input terminal coupled to the output of AND 32, and a down-count input terminal coupled to the output of AND 34. Z-counter 36 has an output terminal $T_z$ coupled to an input terminal of an AND gate 38. The output of AND 38 is coupled to an input of an AND gate 40. The other input of AND 40 is connected to the noncomplementary output terminal Q of flip-flop 28. An AND device 42 has an input terminal coupled to the output of AND 38, and its other input terminal coupled to the noncomplementary output terminal Q of flip-flop 16.

A flip-flop device 44 has its set input terminal S connected to the output of AND 38, and has its noncomplementary output terminal Q connected to an input terminal of AND gate 26 and an input terminal of AND gate 30. An OR gate 46 has four input terminals, connected respectively to the outputs of AND gates 26, 30, 40 and 42.

An AND gate 48 has a "zero" input terminal coupled to the output of AND 11. An AND gate 50 has a "one" input terminal coupled to device input terminal H. A leading edge counter (denoted as $T_L$ counter) 52 has its down-count input terminal coupled to the output of AND 48, and its up-count input terminal coupled to the output of AND 50. Counter 52 has an output terminal $T_L$ coupled to the device output terminal L, and to the set input terminal S of a flip-flop device 54. The non-complementary output terminal Q of flip-flop 54 is coupled to a second input terminal of AND device 38, and to a second input terminal of AND 14.

A delay device 56 has its input terminal coupled to input terminal I, and its output terminal coupled to both the reset terminal R of flip-flop 12 and a shift bus 58 of a shift register 60. Register 60 is comprised of a series of 21 stages, each stage denoted as 62. Each stage 62 has a "zero" output terminal 62a and a "one" output terminal 62b. Each register stage 62 also has a reset terminal 62c. Each shift register stage 62 also has a shift terminal 62d coupled to shift bus 58. Shift register 60 has a "one" input terminal 63a connected to input terminal H, and a "zero" input terminal 63b connected to the output terminal of AND 11. Each reset terminal 62c is connected to output reset terminal R.

AND 18 has a "zero" input terminal connected to "zero" tap 62a of stage 20, which stage's "one" tap 62b is connected to the "one" input of AND 17. Similarily, the "zero" tap 62a of the seventh shift register stage is connected to AND 34, and its "one" tap 32b connected AND 32. Similarly, the sixth register stage has its "zero" tap connected to the "zero" input terminal of AND 50, while its "one" tap 67b is connected to the "one" input of AND 48.

The output of OR device 46 forms the device output terminal T. The output of OR device 46 is connected through a delay device 70 forming the device output terminal R, and is also connected to the reset terminals R of B-counter 15, flip-flops 16, 22, 28, 44, 54, $T_{uv}$-counter 20, Z-counter 36, $T_L$ counter 52, and taps 62c.

DESCRIPTION OF OPERATION

Input terminal I is adapted to receive a pulse signal from an associated IFF subsystem after enough time has elasped to allow all replies of interest to be decoded following each interrogation. Input terminal H is adapted to receive a pulse signal occuring upon reception of a correct reply in any mode (e.g., cryptographic, regular, etc.). This device produces a reset pulse signal at the reset terminal R after a trailing edge has been declared, since this indicates that target evaluation has been completed.

An input pulse will be received at input terminal H each time a correct reply is decoded from the range of interest. An I pulse is received at terminal I for each interrogation but only after all possiblity of receiving a correct replay, and therefore an H pulse, is past. That I pulse is delayed a small amount by delay circuit 56 and then resets flip-flop 12 so that its complementary output ($\overline{Q}$) is placed on AND 11 to enable the latter (this is the initial starting condition).

Thereafter, if an H pulse is received, it sets flip-flop 12 to disable AND 11 so that the next I pulse will not pass through AND 11. The H pulse also passes through OR 13 to AND 14 which is enabled after a leading edge has been declared, i.e., after a $T_L$ output is produced by $T_L$-CTR 52, sets flip-flop 54 and provides an output at the noncomplementary terminal of flip-flop 54. The H pulse is then counted by B-CTR 15.

An I pulse is received for each interrogation after all possibility of receiving a correct reply (H pulse) is past. Since the flip-flop 12 is in the reset condition from the previous I pulse if no H pulse has been received, AND 11 is in an enabled state and the I pulse passes through OR 13 and AND 14 (if the trailing edge has been declared) to register on B-CTR 15. If an H pulse has been received, AND 11 is in a disabled state and the I pulse does not pass to the B-CTR 15, but simply resets flip-flop 12 to enable AND 11 again.

Thus, either an H or an I pulse is passed to the B-counter, but not both. Although an I pulse is received for each interrogation, the fact that it passes through to the counter only when no correct reply (H pulse) is received means, in effect, that I pulses received at the B-CTR 15 denotes only non-correct replies. The B-counter thus counts all interrogations after a leading edge declaration, since it counts all input signals denoting correct and non-correct replies.

The I pulse, if considered a non-correct reply by dint of being passed through AND 11, enters a "zero" in shift register 60 and enables AND 17, AND 32 and AND 48.

The leading edge threshold $T_L$ counter 52 counts up one unit each time a "one" is entered into shift register 60 but only if the sixth stage of register 60 contains "zero"; it counts down one unit each time a "zero" is entered but only if the sixth stage contains a "one", and it is not already at a count of zero. When $T_L$ counter 52 reaches a count of $T_L$ ($T_L$ may be equal to any number less than or equal to 5, for the connections shown in the preferred embodiment) an output pulse is produced at counter 52 output terminal $T_L$. The counter 52 output pulse provides a leading edge declaration (LE) signal to output terminal L for use by associated IFF subsystems.

The counter 52 output signal $T_L$ also sets flip-flop 54, thus producing a noncomplementary output signal at terminal Q that enables AND 38 for pulses from Z-counter 36, and also enables AND 14 for pulses from OR 13. Thus B-counter 15 can now count all succeeding interrogations and will produce an output pulse when a count of B is reached. The value of B is selected to that it is approximately equal to, or slightly larger than, the average number of "hits per scan" past the target. Further discussion of how the pulse from B-counter 15 is used will be provided later.

When a pulse enters input terminal H, it passes OR 13 and AND 14 (assuming AND 14 is enabled by flip-flop 54) to cause B-counter 15 to count up one unit. The H-terminal pulse also causes a "one" to be entered into shift register 60. An input terminal of AND 34 also receives the H-terminal pulse causing the zero counter (Z-counter) 36 to count down one unit but only if the seventh stage of shift register 60 contains a "zero."

When Z-counter 36 reaches a count of $T_z$, it will produce an output signal on its $T_z$ output terminal. This signal can pass AND 38 only after a leading edge had been declared (because AND 38 is then enabled by flip-flop 54). The numerical value of the threshold $T_z$ can easily be adjusted to compensate for whatever setting is used for the leading edge threshold $T_L$.

$T_{ut}$-counter 20 acts to prevent a trailing edge from being declared too soon, and it is called the upper-threshold trailing edge threshold counter. This counter will produce an output signal on its output terminal $T_u$ when its accumulated count reaches an upper-threshold number $T_u$. Reaching this threshold means that $T_u$ replies have been received in response to a run of 19 or fewer consecutive interrogations (for the connections to shift register 60 shown in the embodiment of the present invention).

The pulse from output terminal $T_u$ sets flip-flop 22 and this causes a noncomplementary output signal at flip-flop 22 output terminal Q. This signal enables AND 24 for pulses from output terminal $T_t$. There will be no further output on this trailing edge threshold output terminal $T_t$ until $T_{ut}$-counter 20 counts down to the lower threshold $T_t$ (i.e., until shift register 60 contains only $T_t$ "ones").

Thus $T_{ut}$-counter 20 will produce an output signal (on its output $T_t$) that will pass AND 24 when the threshold $T_t$ is reached, provided that the threshold $T_u$ has been previous reached. Also, there will be an output pulse from Z-counter 36 on its output lead $T_z$, which pulse will go through AND 38 when a count of $T_z$ "zeros" is reached by Z-counter 36.

If a pulse comes from AND 38 before one comes from AND 24, the pulse from AND 38 will set flip-flop 44, but it will be unable to pass AND 40, (and it will not be able to pass AND 42 unless B-counter 15 has reached the count of B). If a pulse from AND 24 before one comes from AND 38, the pulse will set flip-flop 28 but will not be able to pass AND 26.

The setting of flip-flop 44 opens AND 26 for any pulse from AND 24 that follows (and provides one input to AND 30). The setting of flip-flop 28 opens AND 40 for any pulse from AND 38 that follows. Thus, a pulse will pass through AND 26 whenever a pulse from AND 24 follows one from AND 38, and a pulse will pass through AND 40, whenever a pulse from AND 38 follow one from AND 24. Either of these pulse outputs (from AND 26 or AND 40 will pass through OR 46 to produce a trailing edge TE) declaration pulse on output terminal T.

If there has been no output pulse from AND 24 by the time B-counter 15 reaches a count of B, but there has been a pulse from AND 38 then the output from B-counter 15 will pass through AND 30, since the complementary output signal at output terminal $\overline{Q}$ of flip-flop 28 will still be applied, and there will be a noncomplementary voltage signal applied at output terminal Q of flip-flop 44 applied to AND 30. This pulse from B-counter 15 will then go on through OR 46 to produce an output pulse on output terminal T.

If there has been no output pulse from either AND 24 or AND 38 when B-counter 4 reaches the count of B, its output pulse will only set flip-flop 16. The setting of flip-flop 16 will then produce a non-complementary output signal at flip-flop terminal Q which signal opens AND 42 for any succeeding output pulse from Z-counter 36. When a pulse finally does come from Z-counter 36, it will then pass through AND 42 and OR 46 to produce a trailing edge output pulse at output terminal T. The pulse from OR 46 that produces the trailing edge (TE) declaration on output terminal T after short delay produced by delay device 70 also clears shift register 60 and resets all counters and flip-flops so that the device will be ready for inputs from a new target. This reset pulse is also provided at output terminal R for other portions of an associated IFF system.

From the above discussion it may be seen that $T_L$-CTR 52 produces a pulse on $T_L$ when stages 2–7 of shift register 60 contain $T_L$ ones.

The output $T_L$ pulse sets flip-flop 54, enabling AND's 38 and 14. Thus, B-counter 15 starts counting the number of interrogations sent to the unknown as soon as $T_L$-counter 52 declares a "leading edge." It should be noted that any output from Z-counter 36 can thus pass AND 38 as soon as a "leading edge" has been declared. Note that $T_{ut}$-counter 20 can count (up or down) before $T_L$-counter 52 reaches a count $T_L$. Thus, the good replies that produce a leading edge are not ignored (or "wasted").

Since $T_u$ is chosen to be greater than $T_b$, a $T_{ut}$-counter 20 output pulse $T_t$ can pass AND 24 only if $T_{ut}$-counter 20 reaches a count of $T_u$ (thus producing an output pulse that sets flip-flop 22) and then counts back down to $T_t$. Note also that setting flip-flop 28 disables AND 30 and enables AND 40.

Considering first the case where B-counter 15 does not reach a count of B before $T_{ut}$-counter 20 reaches a count $T_u$ and returns to $T_b$ and Z-counter 36 reaches a count of $T_z$;

Z-counter 36 counts the number of zeros in stages 2–7 of shift register 60. Z-counter 36 produces an output pulse (on $T_z$) whenever Z-counter 36 counts $T_z$ or more zeros. The first such pulse (produced after $T_L$-counter 52 has produced its leading edge declaration signal) will go through AND 38 to set flip-flop 44 and go to one input each of AND 40 and AND 42.

If the pulse from AND 24 (produced by $T_{ut}$-counter 20) occurs before the pulse from AND 38 (produced by Z-counter 36), then the pulse from AND 24 will open AND 40 so that the pulse from AND 38 can go directly through AND 40 and OR 46 to output T to produce a trailing edge declaration signal.

If the pulse from AND 38 occurs before the pulse from AND 24 then the pulse from AND 38 will open AND 26 so that the pulse from AND 24 can be directly through AND 26 and OR 46 to output T.

Thus if both:

a. $T_{ut}$-counter 20 reaches a count of $T_u$ and then counts back down to $T_t$; and b. Z-counter 36 reaches a count of $T_z$ before B-counter 15 reaches a count of B, then a pulse appears at output terminal T immediately after (a) or (b), whichever occurs last.

Turning now to consider the second case where B-counter 15 reaches a count of B before both $T_{ut}$-counter 20 reaches a count of of $T_u$ and Z-counter 36 reaches a count of $T_z$:

When B-counter 15 reaches a count of B a pulse from B-counter 15 sets flip-flop 16 and this pulse is also applied to AND 30. This B-counter pulse will go through AND 30 only if Z-counter 36 has previously reached a count of $T_z$ and $T_{ut}$-counter 20 has not yet reached a count of $T_u$ and returned to $T_r$. If it does go through AND 30, of course, it will go on through OR 46 to output terminal T.

Note that each time a pulse reaches output T, this pulse also goes through the delay element Δ 70 and then resets all resettable elements. This is the source of all reset pulses.

Operation of the embodiment of the present invention may be summarized as follows:

a. a pulse on $T_L$ indicates a "leading edge" and started determination of a trailing edge;

b. a pulse will pass AND 24 whenever $T_{ur}$-counter 20 returns to a count of $T_r$ after having reached a count of $T_u$;

c. a pulse will pass AND 38 whenever Z-counter 36 reaches a count of $T_z$;

d. B-counter 15 will produce a pulse when B interrogations following the leading edge declaration signal have been sent to the unknown IFF target to be identified;

e. if both (b) and (c) occur before (d), then a pulse, will appear at output T (TE indicator) immediately after (c) or (d), which ever occurs last;

f. if (d) occurs before either (b) or (c), then a pulse signal will appear at output T when (c) occurs;

g. if (d) occurs after (c) but before (b), a pulse signal will appear at T immediately.

h. if both (b) and (d) occur before (c), a pulse signal will appear at T when (c) occurs.

In all cases there must be a count of $T_z$ unsatisfactory replies out of the last 5 before a trailing edge can be declared, and in addition either:

There must have been enough correct replies to cause $T_{ur}$-counter 20 to reach a count of $T_u$ followed by enough bad ones to reduce the count to $T_r$; or, a total of B interrogations following LE declaration must have been sent.

It will be seen from the above description that the anti-target-splitting beam edge detector of the present invention prevents the declaration of a trailing edge by requiring that both a high percentage of a small number of interrogations elicit no replies (indicated by an output from Z-counter 36 through AND 38) and a corresponding percentage of larger number of interrogations elicit no replies (indicated by an output from $T_{ur}$-counter 20 through AND 24) or that at least a preselected number of interrogations have been sent (indicated by an output from B-counter 15) and a high percentage of a small number of interrogations have failed to elicit replies (indicated by an output from AND 38) before a trailing edge is declared.

It should now be understood that it is important to use two different statistical decision functions simultaneously for trailing edge detection, even though each of the decision functions may have a relatively equal capability of detecting trailing edges for any fixed probability of success on each trial (i.e., round reliability). "Split targets" seldom occur today when the "round reliability" remains constant throughout a scan passed a target and only decreases as the interrogator antenna starts to move off the target. It is the sudden drop in "round reliability" that occurs in or near the center of the beam that cause trailing edge detectors to declare trailing edge prematurely. A premature trailing edge declaration is usually followed automatically by an incorrect leading edge declaration, thus producing an indication of two targets where there is only one. The zero counter Z-counter 36 is similar to current trailing edge detectors in that it responds quickly to sudden drops in "round reliability." However, the upper-threshold-trailing-edge threshold counter ($T_{ur}$-counter 20) cannot and will not produce a trailing edge indication until at least $T_u + (T_u - T_r)$ interrogations have been sent and $(T_u - T_r)$ can easily be made larger than the $T_r$ interrogations required to produce an output from the zero counter Z-counter 36.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A device for use in conjunction with an IFF system which on the basis of replies to interrogations determines and indicates the IFF target leading edge and trailing edge, said IFF system having receiving means for receiving replies to interrogations and for indicating when a reply is correct, said device comprising:

counting means connected to said IFF system for counting the number of interrogations made by the IFF system;

means, connected to said receiving means and to said counting means, for producing a leading-edge signal when a predetermined number $T_L$ of correct replies are received in any consecutive sequence of $W_L$ responses;

means, connected to said receiving means and to said counting means, for producing a trailing-edge signal upon the occurrence of a number of $T_Z$ of non-correct replies in a group of $W_2$ replies and either at least a number B of successive interrogations have been transmitted after a leading-edge signal has been produced, or a number $T_u$ of correct replies is found to exist in a group of $W_u$ received replies followed by reduction of said number $T_u$ to a smaller number $T_r$.

2. A method based upon received replies to IFF interrogations, for determining and indicating occurrence of a IFF target leading edge and trailing edge comprising the steps of:

counting the number of interrogations;

counting the number of correct replies in a sequence W of last responses;

counting the number of incorrect replies in a sequence W of last responses;

subtracting the number of incorrect replies from the number of correct replies to produce a difference quantity T;

indicating that the targets leading edge has occurred if the difference quantity T becomes equal to or greater than a predetermined threshold $T_L$ before a predetermined number N of interrogations are counted;

indicating that the responding signals constitute a trailing edge when said number of incorrect replies received in a group of $W_z$ responses exceeds a predetermined number $T_z$ and either a number B of interrogations have occurred after occurrence of said target leading edge indication, or a number $T_t$ of correct replies is received after receiving a larger number of $T_u$ correct replies in a previous group of replies.

3. A device for use with an IFF system which provides an output (H) for each correct reply reserved in response to its interrogations and an output (I) for each interrogation it sends, the I signal occurring only after all possibility of receiving an H signal is past, said device unambiguously determining and declaring the leading and trailing edges of an IFF target and comprising:

leading-edge means, connected to receive said H signal, for determining and declaring the leading edge of an IFF target after a preselected number $T_L$ of correct replies in response to a preselected number $W_L$ of successive interrogations is received; and trailing-edge means, connected to receive said H and I signals, for determining and declaring the trailing edge of an IFF target when a preselected number $T_Z$ of non-correct (incorrect replies and non-replies) replies are received in response to a preselected number $W_Z$ of successive interrogations and when either a preselected number $T_t$ of correct replies are received in response to a preselected number of successive interrogations after a higher number $T_u$ of correct replies in response to the same number of successive interrogations has been received, or when a count of B successive interrogations is reached after a leading edge has been declared.

* * * * *